Sept. 26, 1972 P. VISSER ET AL 3,694,355
PROCESS FOR THE REMOVAL OF SOLID PARTICLES FROM
AQUEOUS SUSPENSIONS
Filed Sept. 16, 1970
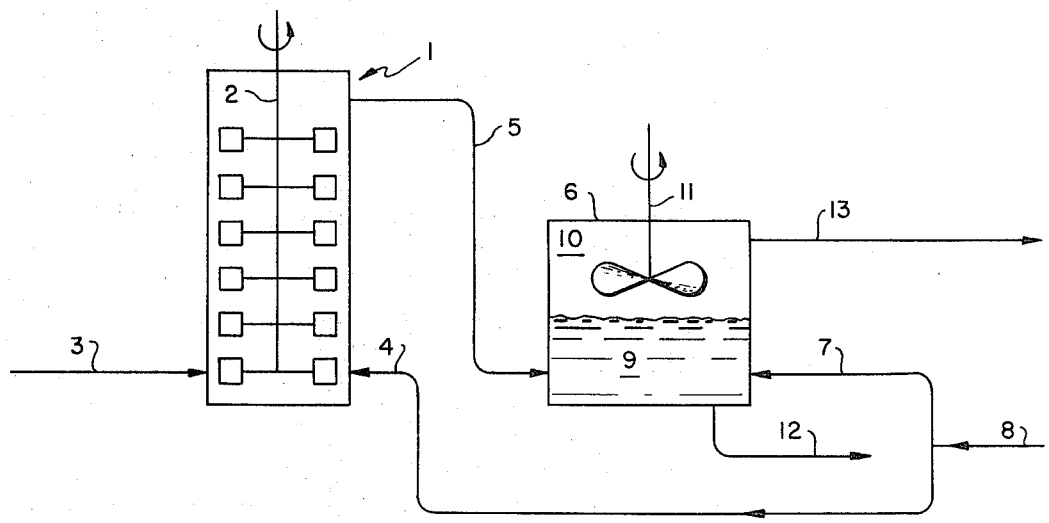
FIG. 1
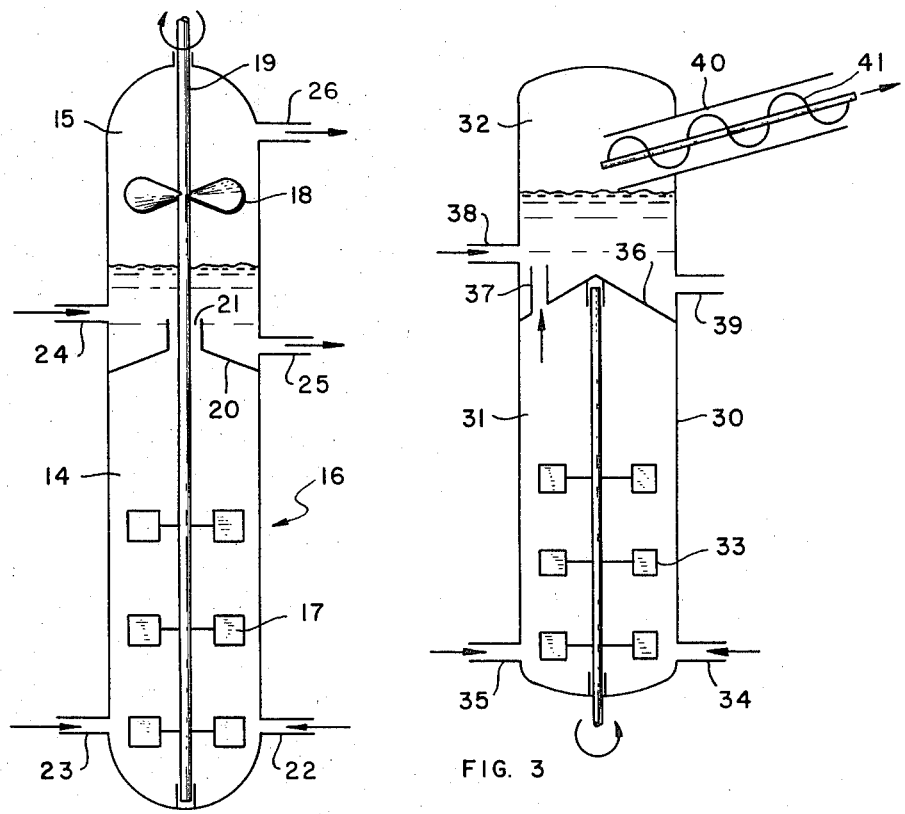
FIG. 2
FIG. 3
INVENTORS:
PITER VISSER
LEONARD W. TER HAAR
BY:
Glen R. Grunewald
THEIR ATTORNEY United States Patent Office 3,694,355
Patented Sept. 26, 1972

3,694,355
PROCESS FOR THE REMOVAL OF SOLID
PARTICLES FROM AQUEOUS SUSPENSIONS
Pieter Visser, Amsterdam, and Leonard W. Ter Haar,
The Hague, Netherlands, assignors to Shell Oil Company, New York, N.Y.
Filed Sept. 16, 1970, Ser. No. 72,741
Claims priority, application Netherlands, Oct. 14, 1969,
6915491
Int. Cl. B01d 11/02
U.S. Cl. 210—21
4 Claims

ABSTRACT OF THE DISCLOSURE

Solid particles such as soot are removed from aqueous suspensions by a two step process, the first step being to agglomerate the particles by contacting them with gentle agitation with a water-immiscible liquid, and then to contact the agglomerate-containing aqueous phase with a continuous phase that is water immiscible under conditions such that the agglomerates enter the non-aqueous phase.

Processes are known where aqueous suspensions of soot are combined with light hydrocarbons in such a way that slurries of soot in hydrocarbon form, which slurries are converted by further processing into suspensions of soot in fuel oils, the light hydrocarbons being recovered. These processes have various disadvantages among which are that the slurry of soot in the light hydrocarbon forms in the presence of water and frequently results in the formation of an emulsion which is difficult to break, the slurries may become viscous, and the hydrocarbon phase may be subject to foaming. The present invention provides a process by which these disadvantages can be obviated.

THE INVENTION

The present invention is a two-stage process in which (a) a water immiscible liquid is mixed with the aqueous suspenson in a first mixing stage with enough agitaton to impart a turbulent motion as a result of which agglomerates of solid particles and water immiscible liquid are formed in the water, and (b) passing the mixture of water and agglomerates to a second stage in which a continuous phase of water immiscible liquid is contacted with the agglomerate-containing water to form a layer of water immiscible liquid in which the agglomerates are present and a clarified water phase.

In the first stage a system of very small solid particles in water is changed into a dispersion of comparatively large particles or fluoccules, with dimensions of about 1 mm. in water. Because of the nature of the particles, formation of an emulsion does not occur, not even if the water immiscible liquid contains emulsifiers such as naphthenic acids or phenols. It is preferred that the supply of water immiscible liquid to the first mixing stage be in a weight ratio to solid particles of from 2:1 to 6:1. Then sufficient liquid is supplied for the production of agglomerates, while there will not remain any free liquid. Agglomerates formed in this manner contain very little water even though they are suspended in water. In the second stage the same or a different water immiscible liquid is supplied, preferably in a ratio to the supply of water immiscible liquid to the mixing stage of from 1:1 to 10:1, but in any event in sufficient quantity so that two layers will form. When adequate contact between phases is provided the agglomerates enter the water immiscible phase (usually the top layer). The bottom layer consists of clean water.

Since the agglomerates are oleophilic and hydrophobic, the water that was present in the immediate vicinity of the agglomerates is largely displaced by the water immiscible liquid. It has been found that at the interface between the two layers in the second stage no emulsion is formed.

Also of importance is that the stream of water immiscible liquid obtained from the second stage, which contains the agglomerates, can be easily transported because the comparatively large agglomerates do not have the effect of increasing the viscosity of the liquid whereas a suspension of unagglomerated particles would increase the viscosity greatly.

Gasoline or naphthas are suitable water immiscible liquids for use in the first stage. Soot particles can be very well agglomerated in these liquid and the agglomerates formed are easily taken up in them if they are also used in the second stage. Benzene and toluene are also suitable.

The regular discharge of the top or water immiscible layer of liquid with agglomerates entrained therein from the second stage is promoted by providing for the top layer in the separting stage to be kept in motion. This can be done by stirring or by the jet effect exerted by one or both of the incoming streams. It has been found that a stirrer power of about 0.1 h.p./m.$^3$ is sufficient. For maintaining the turbulent motion of the contents of the first stage, a stirrer power of 3–10 h.p./m.$^3$ is a suitable value.

The liquid from the top layer in the second stage can be recovered by vaporizing and condensing in the presence of a liquid having a higher boiling point, whereby the second stage liquid is vaporized and the solid particles are suspended in the liquid having the higher boiling point. The heat required may be supplied by previous heating of the higher boiling liquid. It is also possible for heat to be supplied to the evaporator from an outside source. The recovered seceond stage water immiscible liquid as well as the water obtained from the bottom layer in the second stage may be used again.

An important application of the process according to the invention is in a process for the preparation of gases by partial oxidation of hydrocarbons. The hydrocarbon oil that is intended to be used as feedstock for a gas preparation process may be used entirely or partially as the liquid having a higher boiling point than the water immiscible liquid, in which case the resulting suspension of soot in hydrocarbon oil is used as feedstock for the gas preparation process. Naturally, the suspension of soot in the hydrocarbon oil can also be used for other purposes, for instance, as fuel in furnaces or boilers.

An apparatus suitable for carrying out the process according to the invention may consist of a mixing vessel equipped with means for imparting a turbulent motion to a liquid contained therein provided with an inlet for the supply of the aqueous suspension, an inlet for the supply of the water immiscible liquid and an outlet for the discharge of the mixture of water and agglomerates; a separating vessel equipped with an inlet opening into the lower part of this vessel which is connected to the outlet from the mixing vessel, an inlet for the supply of water immiscible liquid, an outlet from the upper part of the vessel for the discharge of the mixture of water immiscible liquid and agglomerates, and an outlet connected to the lower part of the vessel for the discharge of water. It is possible for the separating zone to be located above the mixing zone in the same vessel.

An attractive embodiment is obtained with a vertical cylindrical housing in which there is a partition having an opening at a level of from ⅓ to ¾ of the deight of the housing. The partition divides the space inside the housing into a lower space—the mixing vessel—and an upper space—the separating vessel—and the opening constitutes the outlet for the discharge of the mixture of water and agglomerates from the mixing vessel and the inlet for the supply thereof to the separating vessel. The two vessels are also provided with the other necessary inlets and outlets, and the mixing vessel is further provided with a stirring device. The partition desirably has the shape of an inverted funnel. In the upper part of the separating vessel there may be present a device, for instance, a stirrer, by which the mixture of water immiscible liquid and agglomerates can be kept in motion. This stirring device and the aforementioned stirring device in the mixing vessel may be mounted on one shaft which runs through an opening in the center of the partition.

The outlet for the discharge of the mixture of the immiscible liquid slurry from the separating vessel may consist of a tube sloping upwardly and provided with a mechanical conveyor such as an archimedean screw. The part of the archimedean screw within the separating zone is located directly above the interface between the two layers of liquid, and by the action of the archimedean screw the agglomerates are forced up the tube and outside of the vessel. With such an arrangement for removing solids, a comparatively small stream of water immiscible liquid need be supplied to the separating vessel, so that the entire two-stage process for the removal of solid particles from water may be carried out with not more than 6–10 percent by weight of such liquid in all to 1 percent by weight of solid particles.

The invention will now be further elucidated with reference to some figures and examples.

FIG. 1 represents a highly schematic diagram of a process embodying the invention, and FIGS. 2 and 3 are sectional, elevational views of apparatuses embodying the invention.

FIG. 1 illustrates a mixing vessel 1 provided with a stirrer 2, a line 3 for introducing an aqueous suspension into the lower part of the mixing vessel 1, and a line 4 for introducing water immiscible liquid into the lower part of vessel 1. Under the influence of the turbulent motion of the contents of the mixing vessel, agglomerates of solid particles and water immiscible liquid form. A stream of water and agglomerates leaves the mixing vessel 1 via line 5, and this stream is passed to a separating vessel 6. A stream of immiscible liquid is passed to separating vessel 6 via line 7.

In the separating vessel 6 a bottom layer 9 of clean water and a top layer 10 of water immiscible liquid with agglomerates form. The top layer 10 may be kept in motion with a stirrer 11. The bottom layer 9 is discharged via line 12 and the top layer via line 13. Both streams may be recycled or otherwise appropriately used or disposed of.

By distributing the water immiscible liquid over two stages of the process it is ensured that the formation of an emulsion is prevented and that the transport of material in lines 5 and 7 proceeds readily.

In the embodiment according to FIG. 2, a mixing vessel 14 and a separating vessel 15 are placed one above the other in housing 16. Stirring devices 17 and 18, respectively in the mixing vessel 14 and in the separating vessel 15, are mounted on one shaft 19. A partition 20 having the shape of an inverted funnel separates the mixing zone 14 from the separating zone 15. The shaft 19 protrudes through the aperture 21.

In the lower part of the mixing stage 14 are present an inlet 22 for the supply of the aqueous suspension of solid particles and an inlet 23 for the supply of agglomerating liquid. The opening 21 forms the outlet for the discharge of water with agglomerates from the mixing vessel 14 as well as the inlet for the supply thereof to the separating vessel 15.

The separating vessel 15 is provided with an inlet 24 for the supply of water immiscible liquid which may be connected to the same source of supply as the inlet 23. In the lower part of the separating vessel 15 there is an outlet 25 for the discharge of clean water, and in the upper part there is an outlet 26 for the discharge of agglomerates in water immiscible liquid.

FIG. 3 illustrates another embodiment of this invention. In FIG. 3 a housing 30 is divided into a contacting zone 31 and a separating zone 32 by a partition 36. The contacting zone 31 is provided with a stirrer 33, an inlet 34 for aqueous suspension and an inlet 35 for water immiscible liquid. As a result of the action of stirrer 33, a suspension of agglomerates in water is formed in contacting zone 31 which passes through opening 37 in partition 36 and enters separating zone 32.

Separating zone 32 is provided with an inlet 38 for additional water immiscible liquid, an outlet 39 for clarified water, and an outlet 40 for water immiscible liquid and pellets. In the embodiment of FIGS. 3, the outlet 40 is provided with a screw 41 that extends from near the interface 42 between the aqueous phase and the water immiscible phase to the end of outlet 40. The arrangement of FIG. 3 permits the removal of agglomerates with only a small flow of water immiscible liquid through separating zone 32.

EXAMPLE

With an apparatus approximately as shown in FIG. 2 an aqueous suspension of soot having a soot content of 0.9 percent by weight was treated with gasoline having an end boiling point of 90° C. under various conditions. The results are shown in the table.

| Test Number | Suspension, kg./hr. | Gasoline to— | | |
|---|---|---|---|---|
| | | Contacting zone, kg./hr. | Separating zone, kg./hr. | Agglomerates, kg./hr. |
| 1 | 18 | 0.2 | 1.8 | 0.16 |
| 2 | 21 | 0.6 | 2.0 | 0.19 |
| 3 | 18 | 1.0 | 2.0 | 0.16 |
| 4 | 18 | 0.8 | 4.0 | 0.16 |
| 5 | 18 | 0.4 | 2.0 | 0.16 |
| 6 | 6 | 0.15 | 0.6 | 0.05 |
| 7 a | 18 | 0.5 | 0.5 | 0.16 | a Apparatus with archimedian screw in outlet from separating zone.

In all tests the water phase recovered from the separating zone was substantially free from soot. The phase consisting of agglomerates and gasoline contained only 0.5% water. In test No. 1 flocculent agglomerates were obtained while in all others pellets ranging from approximately 1 mm. to 2 mm. in diameter were obtained. In test No. 7 in which pellets were removed from the separating zone mechanically, a substantially reduced amount of gasoline was required for the same production of agglomerates.

What is claimed is:

1. A process for removing small solid particles from suspension in water in the form of larger solid substantially waterfree agglomerates which comprises:
    (A) contacting the suspension with a discontinuous phase of water immiscible liquid in a mixing zone whereby solid agglomerates of particles in water are formed,
    (B) passing the agglomerate-containing water to a separating zone wherein it contacts a separately introduced continuous phase of water immiscible liquid, whereby the agglomerates enter the continuous water immiscible liquid phase, and
    (C) separately recovering a clarified water phase and an agglomerate-containing water immiscible liquid phase from the separating zone.

2. A process according to claim 1, in which water immiscible liquid is supplied to the mixing zone in a weight ratio to solid particles of from 2:1 to 6:1.

3. A process according to claim 1 in which the water immiscible liquid is gasoline.

4. A process according to claim 1 wherein a mechanical conveyor removes agglomerates from the water immiscible phase in the separating zone.

References Cited

UNITED STATES PATENTS

| | | | |
|---|---|---|---|
| 3,276,995 | 10/1966 | McDonald | 210—21 |
| 3,042,504 | 7/1962 | Carter | 23—314 |
| 2,903,423 | 9/1959 | Mondria et al. | 210—21 |

FOREIGN PATENTS

| | | | |
|---|---|---|---|
| 1,275,564 | 10/1961 | France | 23—314 |
| 962,342 | 7/1964 | Great Britain. | |

MICHAEL ROGERS, Primary Examiner

U.S. Cl. X.R.

210—42